(12) United States Patent
Wadhwa et al.

(10) Patent No.: US 12,354,147 B2
(45) Date of Patent: Jul. 8, 2025

(54) SYSTEMS AND METHODS FOR DETERMINING PRICE BANDS AND USER PRICE AFFINITY PREDICTIONS USING MACHINE LEARNING ARCHITECTURES AND TECHNIQUES

(71) Applicant: Walmart Apollo, LLC, Bentonville, AR (US)

(72) Inventors: Soumya Wadhwa, Sunnyvale, CA (US); Ashish Ranjan, San Jose, CA (US); Selene Xu, San Francisco, CA (US); Hyun Duk Cho, San Francisco, CA (US); Sushant Kumar, Sunnyvale, CA (US); Kannan Achan, Saratoga, CA (US)

(73) Assignee: Walmart Apollo, LLC

( * ) Notice: Subject to any disclaimer, the term of this patent is extended or adjusted under 35 U.S.C. 154(b) by 0 days.

(21) Appl. No.: 18/385,089

(22) Filed: Oct. 30, 2023

(65) Prior Publication Data

US 2024/0062267 A1    Feb. 22, 2024

Related U.S. Application Data

(63) Continuation of application No. 17/163,393, filed on Jan. 30, 2021, now Pat. No. 11,803,889.

(51) Int. Cl.
*G06Q 30/00* (2023.01)
*G06F 16/9538* (2019.01)
(Continued)

(52) U.S. Cl.
CPC ..... *G06Q 30/0629* (2013.01); *G06F 16/9538* (2019.01); *G06N 20/00* (2019.01);
(Continued)

(58) Field of Classification Search
CPC ........... G06Q 30/0629; G06Q 30/0253; G06Q 30/0283; G06Q 30/0631; G06N 20/00; G06F 16/9538
(Continued)

(56) References Cited

U.S. PATENT DOCUMENTS 7,739,203 B2 * 6/2010 Kettner ................ G06Q 10/087
705/28
10,032,205 B2 7/2018 Pathak et al.
(Continued)

OTHER PUBLICATIONS

"Walmart Apollo Obtains Patent for System, Method and Non-Transitory Computer-Readable Storage Media for Displaying Product Information on Website," Global IP News. Information Technology Patent News [New Delhi] Jul. 24, 2018; Dialog #2075434318, 2pgs. (Year: 2018) Jul. 24, 2018.
(Continued)

*Primary Examiner* — Robert M Pond
(74) *Attorney, Agent, or Firm* — FOLEY & LARDNER LLP

(57) ABSTRACT

A system comprising one or more processors and one or more non-transitory computer-readable media storing computing instructions that, when executed on the one or more processors, cause the one or more processors to perform operations comprising: evaluating, using a price band determination model, degrees of expensiveness of items relative to each other in item type categories; generating, using the price band determination model, price bands associated with item type categories; assigning each of the items to a respective one of the price bands associated with a respective one of the item type categories; and presenting, to one or more end-user applications, at least one other item corresponding to at least one of the price bands associated with at least one of the item type categories. Other embodiments are disclosed.

20 Claims, 8 Drawing Sheets

(51) Int. Cl.
<table>
<tr><td>G06N 20/00</td><td>(2019.01)</td></tr>
<tr><td>G06Q 30/0251</td><td>(2023.01)</td></tr>
<tr><td>G06Q 30/0283</td><td>(2023.01)</td></tr>
<tr><td>G06Q 30/0601</td><td>(2023.01)</td></tr>
</table>

(52) U.S. Cl.
CPC ..... *G06Q 30/0253* (2013.01); *G06Q 30/0283* (2013.01); *G06Q 30/0631* (2013.01)

(58) Field of Classification Search
USPC .................................................. 705/26, 27
See application file for complete search history.

(56) References Cited

U.S. PATENT DOCUMENTS

| | | | |
|---|---|---|---|
| 10,318,534 B2 | 6/2019 | Pinckney et al. | |
| 10,417,653 B2 | 9/2019 | Milton et al. | |
| 11,556,941 B2 | 1/2023 | Shido et al. | |
| 2003/0120534 A1* | 6/2003 | Giacchetti | G06Q 30/0631 705/26.7 |
| 2005/0197972 A1* | 9/2005 | Kettner | G06Q 30/0643 705/400 |
| 2005/0283389 A1* | 12/2005 | Widjaja | G06Q 10/025 705/5 |
| 2008/0270398 A1* | 10/2008 | Landau | G06Q 30/0601 705/26.1 |
| 2010/0198628 A1 | 8/2010 | Rayner | |
| 2014/0289071 A1* | 9/2014 | Fox | G06Q 30/0255 705/26.7 |
| 2018/0107917 A1* | 4/2018 | Hewavitharana | G06F 16/2468 |
| 2019/0311301 A1* | 10/2019 | Pyati | G06F 16/901 |
| 2021/0042663 A1* | 2/2021 | Agustin | G06V 20/70 |
| 2021/0073822 A1 | 3/2021 | Shido | |
| 2021/0073832 A1* | 3/2021 | Shido | G06Q 30/0623 |

OTHER PUBLICATIONS

Aslanyan, Gr., et al., "Personalized Ranking in ECommerce Search," eBay, Inc., arXiv: 1905.00052v1 [cs.IR], Apr. 30, 2019, 5 pgs. Apr. 30, 2019.
Benesty, J., et al., Pearson Correlation Coefficient. In Noise Reduction in Speech Processing. Springer, 1-4 2009.
Bonner, S., and Vasile, F., "Casual Embeddings for Recommendation," arXiv:1706.07639v6 [cs.IR] Aug. 3, 2018, 9 pgs. Aug. 3, 2018.
Chen, P., and Wu, S, "Does Collaborative Filtering Technology Impact Sales?" Empirical Evidence from Amazon.com Jul. 5, 2007.
Chen, P., Wu, S., and Yoon, J., "The Impact of Online Recommendations and Consumer Feedback on Sales," ICIS 2004 Proceedings, http://aisel.aisnet.org/icis2004/58; 15 pgs. Dec. 2004.
Cheng, H., et al., "Wide & Deep Learning for Recommender Systems," Google Inc., arXiv:1606.07792v1 [cs.LG] Jun. 24, 2016, 4 pgs. Jun. 24, 2016.
Croft, W.B., Metzler, D., and Strohman, T., "Search Engines—Information Retrieval in Practice," published by Pearson Education, Inc. 2015 2015.
Degeratu, A., Rangaswamy, A., and Wu, J., "Consumer Choice Behavior in Online and Traditional Supermarkets: The Effects of Brand Name, Price, and Other Search Attributes," Int'l Journal of Research in Marketing, vol. 17, No. 1, p. 55-78 Apr. 1998.
Erdem, T., Swait, J., and Louviere, J., "The Impact of Brand Credibility on Consumer Price Sensitivity," Intern. J. of Research in Marketing 19 (2002), 19 pgs. Aug. 28, 2001.
Gomez-Uribe, C., and Hunt, N., "The Netflix Recommender System: Algorithms, Business Value, and Innovation," ACM Trans. Manage. Inf. Syst. 6, 4, Artcile 13, 19 pgs. DOI: http://dx.doi.org/10.1145/2843948 Dec. 2015.
Grbovic, M., et al., "E-Commerce in Your Inbox: Product Recommendations at Scale," KDD '15, Aug. 10-13, 2015, Sydney, NSW, Australia, ACM. arXiv:1606.07154v1 [cs.A1] Jun. 23, 2016, 10 pgs. Aug. 2015.

Greenstein-Messica, A. and Rokach, L., "Personal Price Aware Multi-Seller Recommender System: Evidence from eBay," Knowledge=Based Systems 150 (2018); https://doi.org/10.1016/j.knosys.2018.02.026, pp. 14-26 Feb. 19, 2018.
Guo, H., et al., "DeepFM: A Factorization-Machine Based Neural Network for CTR Prediction," arXiv:1703.04247v1 [cs.IR] Mar. 13, 2017, 8 pgs. Mar. 13, 2017.
Han, S., Gupta, S., and Lehmann, D., "Consumer Price Sensitivity and Price Thresholds," Journal of Retailing 77 (2001) pp. 435-456 Sep. 24, 2001.
He, X., et al., "Neural Collaborative Filtering," arXiv:1708.05031v2 [cs.IR] Aug. 26, 2017, 10 pgs. Aug. 26, 2017.
Hidasi, B., Karatzoglou, A., Baltrunas, L., and Tikk, D., "Session-Based Recommendations With Recurrent Neural Networks," arXiv:1511.06939v4 [cs.LG] Mar. 29, 2016, 10 pgs. Mar. 29, 2016.
Hu, Y., Koren, Y., and Volinsky, C., "Collaborative Filtering for Implicit Feedback Datasets," 8th IEEE International Conf. on Data Mining, pp. 263-272, 10 pgs. 2008.
Jannach, D., Ludewig, M., and Lerche, L., Session-Based Item Recommendation in e-Commerce on Short-Term Intents, Reminders, Trends, and Discounts, 27, 3-5 (Dec. 2017), 351-392. https://doi.org/10.1007/s11257-017-9194-1, 36 pgs. Dec. 2017.
Jarvelin, K., and Kekalainen, J., "Cumulated Gain-Based Evaluation of IR Techniques," ACM Transactions on Information Systems, vol. 20, No. 4, Oct. 2002, pp. 422-446 Oct. 2002.
Kaul, A., and Wittink, D., "Empirical Generalizations About the Impact of Advertising on Price Sensitivity and Price," Marketing Science, vol. 14, No. 3, Part 2 of 2. 1995 11 pgs. 1995.
King, G. and Zeng, L., "Logistic Regression in Rare Events Data," Society for Political Methodology (2001) pp. 137-163 Feb. 16, 2001.
Kipf, T. and Welling, M., "Semi-Supervised Classification With Graph Convolutional Networks," arXiv:1609.02907v4 [cs.LG], 14 pgs. Feb. 22, 2017.
Koren, Y., Bell, R., and Volinsky, C., "Matrix Factorization Techniques for Recommender Systems," IEEE Computer Society, 0018-9162/09, pp. 4249 Aug. 2009.
Loh, W., "Fifty Years of Classification and Regression Trees," International Statistical Review (2014), 82, 3, 329-348 doi:10.1111/insr.12016, 42 pgs. 2014.
MacQueen, J., et al., "Some Methods for Classification and Analysis of Multivariate Observations," In Proceedings of the 5th Berkeley Symposium on Mathematical Statistics and Probability, vol. 1, Oakland, CA, pp. 281-297 1967.
Manning, C., Raghavan, P., and Schutze, H., "An Introduction to Information Retrieval," Cambridge University Press, 2009 Apr. 1, 2009.
Pearlmutter, B., "Gradient Calculations for Dynamic Recurrent Neural Networks: A Survey," IEEE Transactions on Neural Networks, 20 pgs. Jul. 20, 1995.
Pedregosa, F., et al., "Scikit-Learn: Machine Learning in Python," Journal of Machine Learning Research 12 (2011) 2825-2830, 6 pgs. Oct. 2011.
Rendle, S., "Factorization Machines," IEEE International Conference on Data Mining, pp. 995-1000 2010.
Rendle, S., et al., "BPR: Bayesian Personalized Ranking from Implicit Feedback," UAI 2009, pp. 452-461 2009.
Reynolds, D., "Gaussian Mixture Models," Encyclopedia of Biometrics 741, 5 pgs. 2009.
Sarwar, B., Karypis, G., Konstan, J., and Riedl, J., "Item-Based Collaborative Filtering Recommendation Algorithms," WWW10, May 1-5, 2001, Hong Kong, ACM 1-58113-348-0/01/0005, 11 pgs. May 1, 2001.
Shankar, V., Rangaswamy, A., and Pusateri, M., "The Online Medium and Customer Price Sensitivity (working paper)," eBRC 1999, 25 pgs. 1999.
Smith, B., and Linden G., "Two Decades of Recommender Systems at Amazon.com," IEEE Computer Society, 1089-7801/17, 2017, 7 pgs. 2017.
Teevan, J., Dumais, S., and Horvitz, E., "Personalizing Search Via Automated Analysis of Interests and Activities," SIGIR '05, Aug. 15-19, 2005, Salvador, Brazil. ACM 1-59593-034-5-05-0008, 8 pgs. Aug. 15, 2005.

(56) References Cited

OTHER PUBLICATIONS

Vasile, F., Smirnova, E., and Conneau, A., "Meta-Prod2Vec—Product Embeddings Using Side-Information for Recommendation," RecSys '16, Sep. 15-19, 2016, Boston, MA, USA, ACM. ISBN 978-1-4503-4035-9/16/09, DOI: http://dx.doi.org/10.1145/2959100.2959160; 8 pgs. Sep. 15, 2016.

Wakefield, K., and Inman, J., "Situational Price Sensitivity: The Role of Consumption Occasion, Social Context, and Income," Journal of Retailing 79 (2003) pp. 199-212 Sep. 2, 2003.

Zaharia, M., et al., "Apache Spark A Unified Engine for Big Data Processing," Comm. of the ACM, vol. 59, No. 11, pp. 5665 Nov. 2016.

Zheng, Y., et al., "Price-Aware Recommendation With Graph Convolutional Networks," arXiv:2003.03975v1 [cs.IR] Mar. 9, 2020, 12 pgs. Mar. 9, 2009.

Kleinbaum, D., et al., "Logistics Regression: A Self-Learning Text," 3rd Edition, Springer New York Dordrecht Heidelberg London, ISBN: 978-1-4419-1741-6, 709 pgs. 2010.

\* cited by examiner

- 401 – Storage Module(s)
  - 330 – Electronic Platform
    - 410 – Database(s)
      - 310 – Items
        - 411 – Metadata
          - 412 – Prices
      - 315 – Item Type Categories
      - 311 – Historical Usage Data
    - 350 – Machine Learning Architecture
      - 370 – Affinity Prediction Model
        - 375 – Price Affinity Predictions
      - 360 – Price Band Determination Model
        - 365 – Price Bands
      - 320 – Similarity Model
        - 425 – Item-Item Price Similarity Scores
        - 421 – Pearson Correlation Model
        - 422 – Matrix Factorization Model
      - 420 – Training Procedure(s)
      - 380 – Ranking Engine
        - 481 – Input Features
        - 482 – Relevance Scores
        - 483 – Ranking Results
    - 390 – End-User Application(s)
      - 491 – Recommendation Results
      - 492 – Search Results
      - 493 – Advertisements
      - 395 – Outputs
- 402 – Processing Module(s)

360– Price Band Determination Model

- 365– Price Bands
  - 515– Expensiveness Indicator
  - 516– Price Range Boundaries

- 510– Clustering Model
  - 511– K-Means Model — 513– Clusters
  - 512– Gaussian Mixture Model — 513– Clusters

- 520– Transaction Balancing Model
  - 525– Transaction Volumes

- 530– Statistical Model
  - 531– Range-based Statistical Model
  - 532– Percentile-based Statistical Model

310– Items

- 411– Metadata
  - 412– Prices
  - 515– Expensiveness Indicator

710– Provide a machine learning architecture that is configured to evaluate expensiveness of items included in an item type category relative to each other

720– Receive prices associated with the items included in the item type category

730– Generate, using a price band determination model associated with the machine learning architecture, a plurality of price bands based, at least in part, on the prices associated with the items

740– Assign each of the items to one of the plurality of price bands

750– Customizing or personalizing outputs of one or more end-user applications based, at least in part, on the price bands associated with the items

810– Determining price bands for an item type category using a price band determination model of a machine learning architecture

820– Associating items included in the item type category with the price bands

830– Analyzing price band activity data indicating a user's interactions with respect to the items included in each of the price bands for the item type category

840– Generating one or more price affinity predictions which indicate or predict the user's affinity or preference of the user for items associated with one or more of the price bands

FIG. 8

SYSTEMS AND METHODS FOR DETERMINING PRICE BANDS AND USER PRICE AFFINITY PREDICTIONS USING MACHINE LEARNING ARCHITECTURES AND TECHNIQUES

CROSS-REFERENCE TO RELATED APPLICATIONS

The present application is a Continuation Application of U.S. patent application Ser. No. 17/163,393 filed on Jan. 30, 2021. U.S. patent application Ser. No. 17/163,393 is herewith incorporated by reference in its entirety

TECHNICAL FIELD

This disclosure relates generally to machine learning architectures that are configured to learn functions associated with generating price bands and user affinity predictions for usage by various end-user applications.

BACKGROUND

Price is often a key consideration for users when deciding whether to purchase items. User price preferences for purchasing expensive or inexpensive items can vary greatly, and often differ across different item categories. For example, while one user may prefer to purchase high-quality electronic equipment (e.g., computers or tablets) that is relatively expensive for that item category, that same user may prefer to purchase inexpensive clothing or apparel items.

Electronic platforms that offer items for sale can benefit in various ways from understanding the relative expensiveness of items across various categories, and user affinities for purchasing items in price bands for particular item categories. However, configuring a system to learn or understand what constitutes a high-priced or low-priced item is a technically difficult problem.

The absolute value of a price tag is not sufficient to understand whether or not given item is expensive. For example, a laptop having price tag of one hundred dollars may be considered a relatively inexpensive price for that item, but the same price tag for a pen may be very expensive. Along similar lines, the absolute values of price tags associated with a user's purchases also is in sufficient to determine whether that user desires to purchase relatively expensive or inexpensive items for particular categories.

In view of the foregoing, providing a framework that enables an electronic platform to understand these nuances pertaining to the subjective expensiveness of items and user affinities towards particular prices can be leveraged for various purposes, which both increase customer satisfaction and improve conversion rates for the electronic platforms.

BRIEF DESCRIPTION OF THE DRAWINGS

To facilitate further description of the embodiments, the following drawings are provided in which:

FIG. 4 illustrates a representative block diagram of a portion of the system of FIG. 3, according to an embodiment;

FIG. 5 illustrates a representative block diagram of a portion of the system of FIGS. 3 and 4, according to an embodiment;

FIG. 7 illustrates a flowchart for a method, according to certain embodiments; and FIG. 8 illustrates a flowchart for a method, according to certain embodiments.

Figure 1:
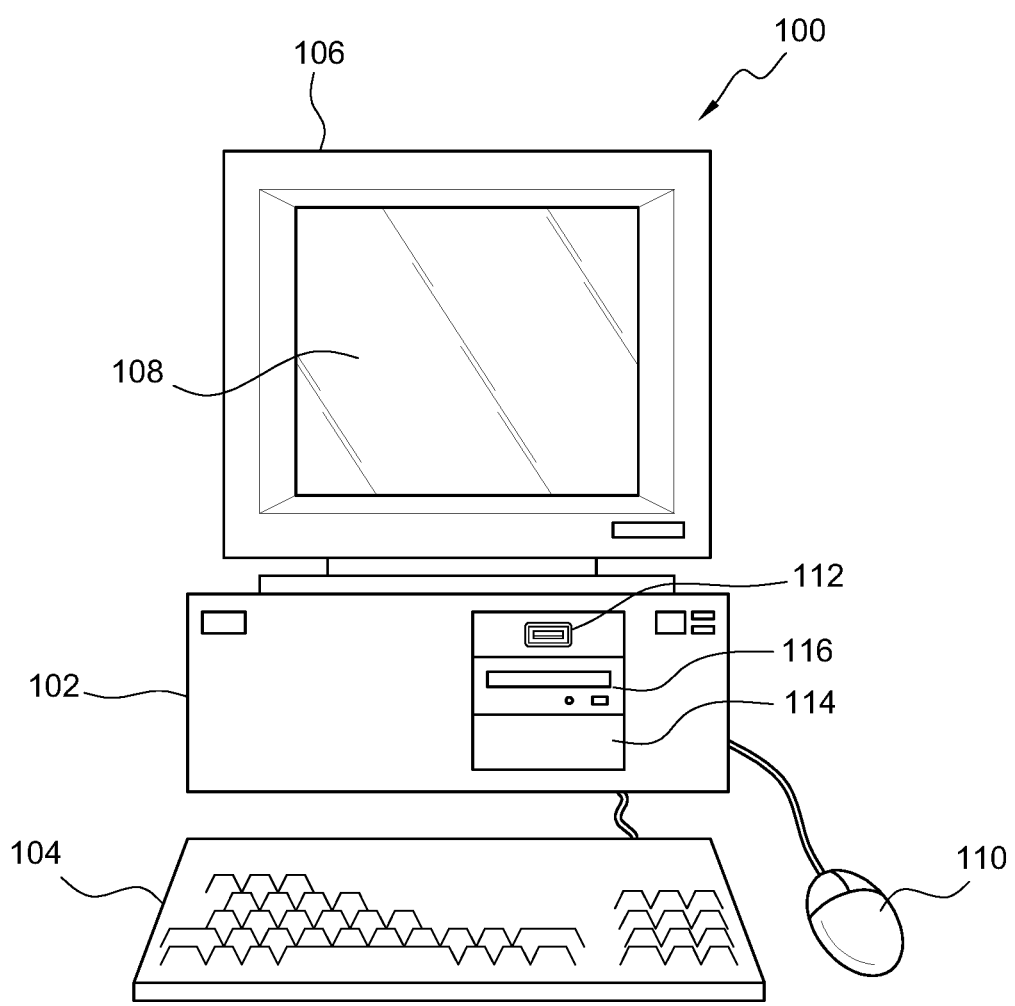
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform functions including: providing a machine learning architecture that is configured to evaluate expensiveness of items relative to each other, wherein the items are included in an item type category; receiving prices associated with the items included in the item type category; generating, using a price band determination model associated with the machine learning architecture, price bands based, at least in part, on the prices associated with the items, each of the price bands being associated with separate price range boundaries for the item type category; and assigning each of the items to one of the price bands.

Various embodiments include a method. The method can be implemented via execution of computing instructions configured to run at one or more processors and configured to be stored at non-transitory computer-readable media. The method can comprise: providing a machine learning architecture that is configured to evaluate expensiveness of items relative to each other, wherein the items are included in an item type category; receiving prices associated with the items included in the item type category; generating, using a price band determination model associated with the machine learning architecture, price bands based, at least in part, on the prices associated with the items, each of the price bands being associated with separate price range boundaries for the item type category; and assigning each of the items to one of the price bands.

Another system can include one or more processors and one or more non-transitory computer-readable storage devices storing computing instructions. The computing instructions can be configured to run on the one or more processors and perform functions including: determining, using a price band determination model of a machine learning architecture, price bands for an item type category; associating items included in the item type category with the price bands; analyzing, using an affinity prediction model of the machine learning architecture, price band activity data indicating interactions of a user with respective items included in each of the price bands for the item type category; and generating, using the affinity prediction model of the machine learning architecture, one or more price affinity predictions for the user based, at least in part, on the price band activity data, wherein the one or more price affinity predictions predict a preference of the user for respective items associated with one or more of the price bands.

Another method can be implemented via execution of computing instructions configured to run at one or more processors and configured to be stored at non-transitory computer-readable media. The method can comprise: determining, using a price band determination model of a machine learning architecture, price bands for an item type category; associating items included in the item type category with the price bands; analyzing, using an affinity prediction model of the machine learning architecture, price band activity data indicating interactions of a user with respective items included in each of the price bands for the item type category; and generating, using the affinity prediction model of the machine learning architecture, one or more price affinity predictions for the user based, at least in part, on the price band activity data, wherein the one or more price affinity predictions predict a preference of the user for respective items associated with one or more of the price bands.

A number of embodiments can include a system including one or more processors and one or more non-transitory computer-readable media storing computing instructions that, when executed on the one or more processors, cause the one or more processors to perform certain acts. The acts can include evaluating, using a price band determination model, degrees of expensiveness of items relative to each other in item type categories. The acts also can include generating, using the price band determination model, price bands associated with item type categories. The acts further can include assigning each of the items to a respective one of the price bands associated with a respective one of the item type categories. The acts additionally can include assigning each of the items to a respective one of the price bands associated with a respective one of the item type categories. The acts also can include presenting, to one or more end-user applications, at least one other item corresponding to at least one of the price bands associated with at least one of the item type categories.

Various embodiments can include a method being implemented via execution of computing instructions configured to run at one or more processors and configured to be stored at non-transitory computer-readable media. The method can include evaluating, using a price band determination model, degrees of expensiveness of items relative to each other in item type categories. The method also can include generating, using the price band determination model, price bands associated with item type categories. The method further can include assigning each of the items to a respective one of the price bands associated with a respective one of the item type categories. The method additionally can include assigning each of the items to a respective one of the price bands associated with a respective one of the item type categories. The method also can include presenting, to one or more end-user applications, at least one other item corresponding to at least one of the price bands associated with at least one of the item type categories.

Figure 2:
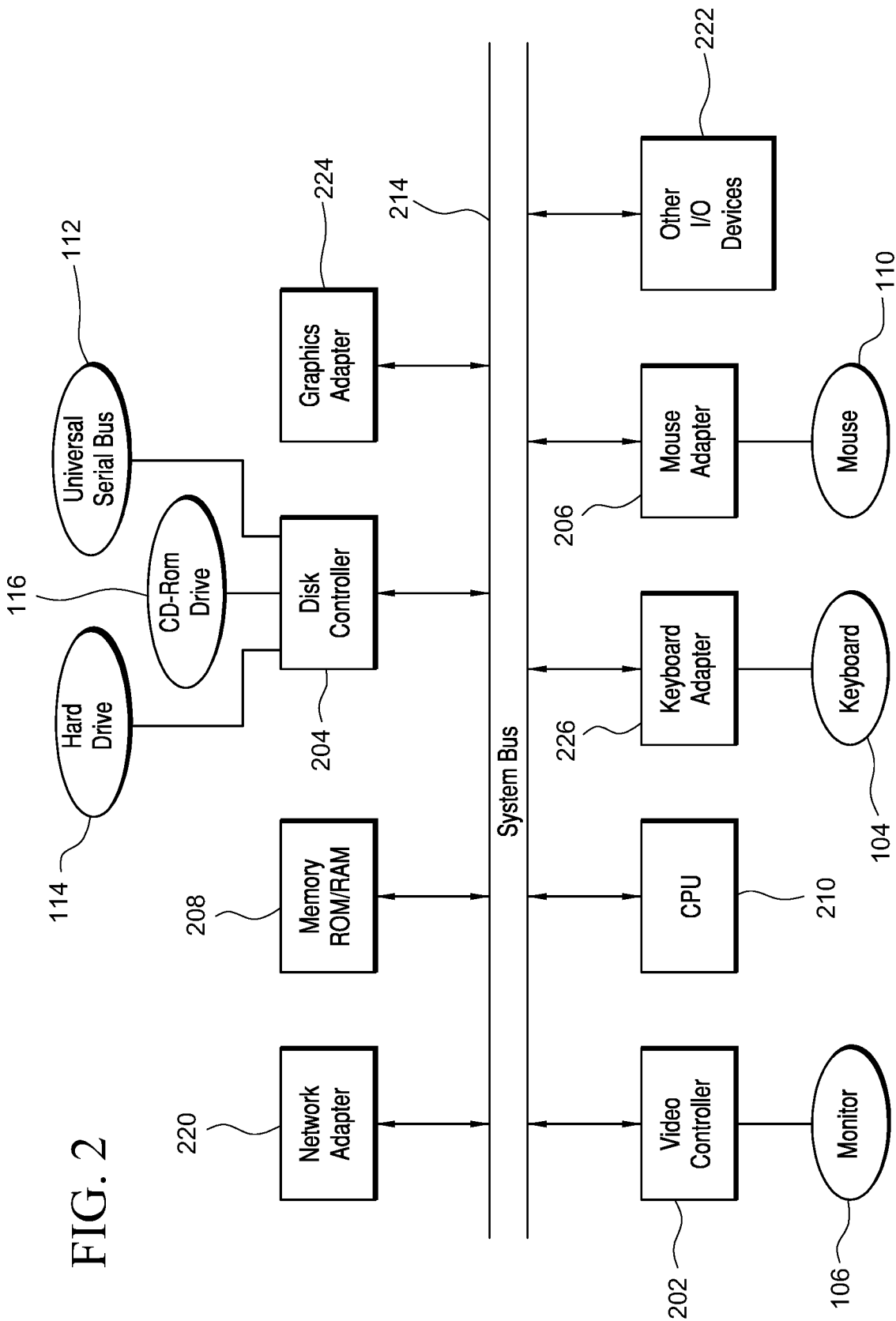
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or additionally, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
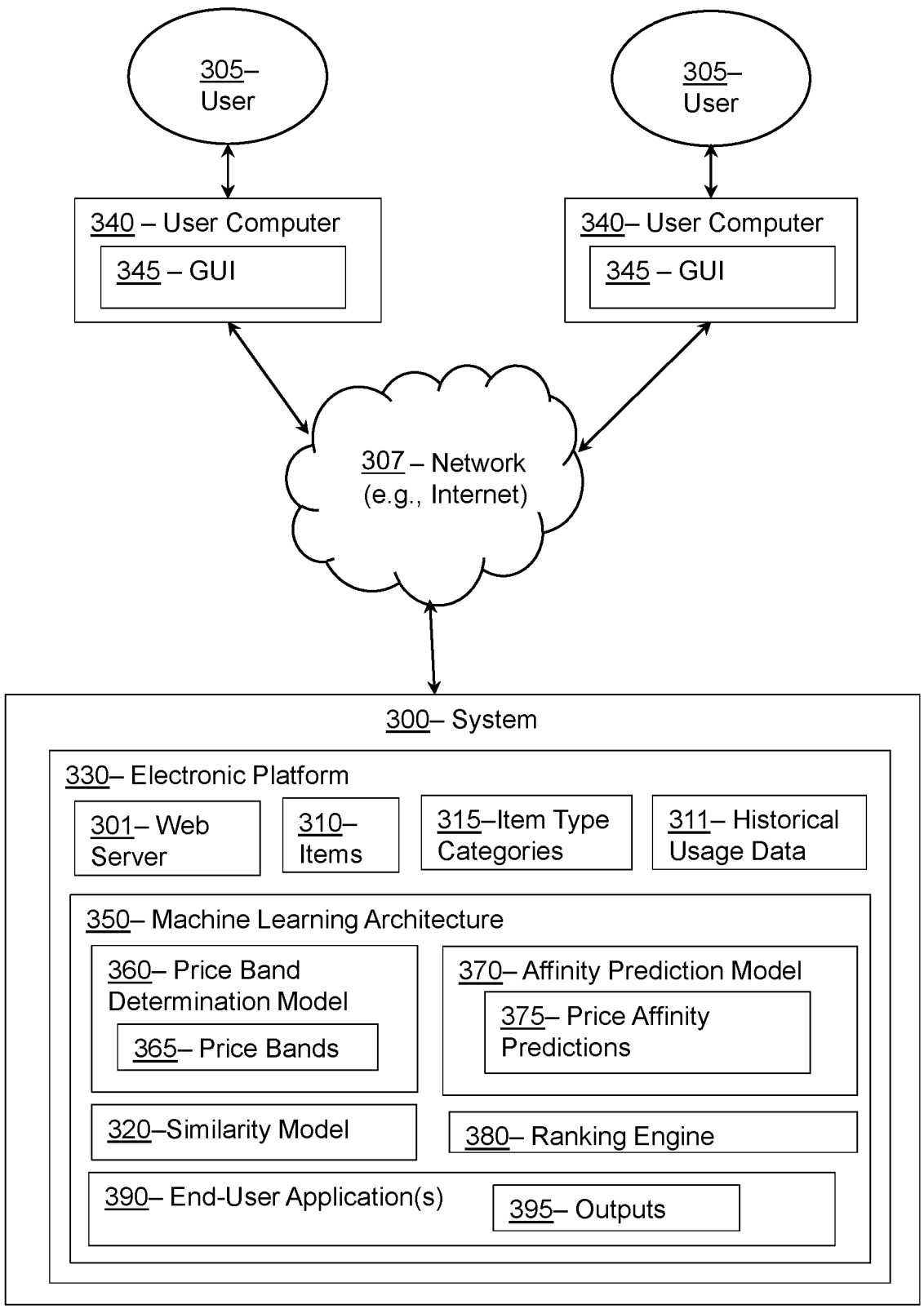
FIG. 3 illustrates a representative block diagram of a system, according to an embodiment.

Turning ahead in the drawings, FIG. 3 illustrates a block diagram of a system 300 that can be employed for determining price bands and generating price affinity predictions using machine learning architectures and techniques, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 301, a similarity model 320, an electronic platform 330, a machine learning architecture 350, a price band determination model 360, an affinity prediction model 370, a ranking engine 380, and an end-user application 390. Web server 301, electronic platform 330, machine learning architecture 350, similarity model 320, price band determination model 360, affinity prediction model 370, ranking engine 380, and end-user application 390 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 301, electronic platform 330, machine learning architecture 350, similarity model 320, price band determination model 360, affinity prediction model 370, ranking engine 380, and end-user application 390. Additional details regarding web server 301, electronic platform 330, machine learning architecture 350, similarity model 320, price band determination model 360, affinity prediction model 370, ranking engine 380, and end-user application 390 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or one or more server computers (e.g., one or more server computer that host system 300 or a portion thereof). In the same or different embodiments, GUI 345 can comprise a website accessed through network 307 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 301 can be in data communication through network 307 (e.g., the Internet) with user computers (e.g., 340). In certain embodiments, the network 307 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, web server 301, electronic platform 330, machine learning architecture 350, similarity model 320, price band determination model 360, affinity prediction model 370, ranking engine 380, and end-user application 390 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) associated with web server 301, electronic platform 330, machine learning architecture 350, similarity model 320, price band determination model 360, affinity prediction model 370, ranking engine 380, and end-user application 390 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 301, electronic platform 330, machine learning architecture 350, similarity model 320, price band determination model 360, affinity prediction model 370, ranking engine 380, and end-user application 390. In a similar manner, the processing module(s) and the memory storage module(s) can be local and/or remote to each other.

In many embodiments, web server 301, electronic platform 330, machine learning architecture 350, similarity model 320, price band determination model 360, affinity prediction model 370, ranking engine 380, and end-user application 390 can be configured to communicate with one or more user computers 340. In some embodiments, user computers 340 also can be referred to as customer computers. In some embodiments, web server 301, electronic platform 330, machine learning architecture 350, similarity model 320, price band determination model 360, affinity prediction model 370, ranking engine 380, and end-user application 390 can communicate or interface (e.g., interact) with one or more customer computers (such as user computers 340) through a network 307 (e.g., the Internet). Network 307 can be an intranet that is not open to the public. Accordingly, in many embodiments, web server 301, electronic platform 330, machine learning architecture 350, similarity model 320, price band determination model 360, affinity prediction model 370, ranking engine 380, and end-user application 390 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 301, electronic platform 330, machine learning architecture 350, similarity model 320, price band determination model 360, affinity prediction model 370, ranking engine 380, and end-user application 390 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between or among web server 301, electronic platform 330, machine learning architecture 350, similarity model 320, price band determination model 360, affinity prediction model 370, ranking engine 380, and end-user application 390, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to access interfaces that display details about items 310, add items 310 to a digital shopping cart, and to purchase the added items 310. The items 310 made available via the electronic platform 330 may generally relate to any type of product and/or service including, but not limited to, products and/or services associated with entertainment, furniture, apparel, kitchenware, fashion, appliances, sporting goods, electronics, software, etc.

The electronic platform 330 may store taxonomy information associated with the classifying the items 310 that are offered through the electronic platform 330. For example, the taxonomy information can include a hierarchy of categories and sub-categories, and each item 310 included in an online catalog can be associated with one or more of the categories and sub-categories. High-level categories may include broad labels such as "Beauty," "Clothing, Shoes, & Accessories," "Sports & Outdoors," etc. One or more lower-level categories may segment each of the high-level categories into more specific categories. The lower-level categories can include item type categories 315. While the taxonomy information may vary across different electronic platforms 330, item type categories 315 may represent the most granular level of classification in the taxonomy in some cases. Examples of item type categories 315 within an "Electronics" category can include categories associated with labels such as "TVs," "cell phones," "tablets," etc. Each item 310 offered by the electronic platform 330 can be assigned to, or associated with, one or more item type categories 315.

The electronic platform 330 can be configured to store historical usage data 311, which records some or all activities involving users' 305 interactions with electronic platform 330 and/or items 310 offered through the electronic platform 330. In certain embodiments, the historical usage data 311 can store information for each user 305 that indicates some or all of the following: any items 310 that were viewed by user 305; any items 310 that were selected (e.g., using a mouse click and/or tap gesture) by user 305; any items 310 that were added to a digital shopping cart by the user 305; any items 310 that were purchased by the user 305; any advertisements displayed to the user 305; any items 310 that were identified in advertisements displayed to the user 305; any advertisements that were selected (e.g., using a mouse click and/or tap gesture) by user 305; pricing information associated with any items 310 that were viewed, selected, purchased, added to a digital shopping cart, and/or included in advertisements that were presented to the user 305; item type categories 315 associated with any items 310 that were viewed, selected, purchased, added to a digital shopping cart, and/or included in advertisements that were presented to the user 305; and/or any other data related to the user's 305 interactions with the electronic platform 330 and/or items 310 offered through the electronic platform 330.

The electronic platform 330 also may include and/or execute one or more end-user applications 390 that generate outputs 395 for display to users 305 on user computers 340. In some cases, the outputs 395 displayed to a user 305 can be customized, at least in part, using the historical usage data 311 collected for that specific 305 and/or collected from other users 305.

The types of end-user applications 390, as well as the functions they perform, can vary significantly. In one example, an end-user application 390 may be configured to recommend items 310 to users (e.g., alternative and/or complimentary items), and the outputs 395 may include a listing of one or more recommended items 310. In another example, an end-user application 390 may be configured to facilitate searches on the electronic platform 330 (e.g., searches on a digital catalog of items available via the electronic platform 330), and the outputs 395 may include a listing of one or more search results (e.g., corresponding to relevant items 310 that are ranked and ordered for display to users 305). In another example, an end-user application 390 may be configured to select and/or present advertisements corresponding to one or more items 310 for display to users 305, and the outputs 395 may include the selected advertisements. Many other types of end-user applications 390 may be provided on, or executed in connection with, the electronic platform 330.

As explained in further detail below, the electronic platform 330 may include a machine learning architecture 350 that can optimize the outputs 395 generated by the end-user applications 390 in various ways. The machine learning architecture 350 can utilize technical improvements in machine learning technologies to optimize the outputs 395 in manner that increases both satisfaction of users 305 (e.g., by providing more accurate and/or personalized outputs 395) and the conversion rates for purchasing items 310 on the electronic platform 330. For example, in certain embodiments, the machine learning architecture 350 may enhance the generation and/or selection of item recommendations, search results, advertisements, and/or other outputs 395 by learning the relative expensiveness of items 310 for particular item type categories 315, and utilizing this information to generate and/or select outputs 395. In some embodiments, the machine learning architecture 350 also may enhance the generation and/or selection of item recommendations, search results, advertisements, and/or other outputs 395 by predicting user affinities for purchasing items 310 based on the relative expensiveness of items 310 for particular item type categories 315. The machine learning architecture 350 may enhance the generation and/or selection of outputs 395 in many other ways, as discussed in further detail below.

The configuration of the machine learning architecture 350 can vary. The machine learning architecture 350 can include one or more machine learning models and/or artificial neural networks that are configured to execute deep learning functions, artificial intelligence (AI) functions, and/or machine learning functions to perform the functions described herein.

In certain embodiments, the machine learning architecture 350 can be trained to perform various functions associated with the generating, selecting, and/or ranking of the outputs 395. Exemplary functions may include determining price bands 365 for various item type categories 315, assigning items 310 to the price bands 365, generating price affinity predictions 375, determining similarity for price bands across items 310 in different item type categories 315, ranking and scoring items 310 associated with the outputs 395, and/or other functions described herein. The machine learning architecture 350 (including the similarity model 320, price band determination model 360, affinity prediction model 370, and/or ranking engine 380) can be trained to perform these and other functions using any supervised, semi-supervised, and/or unsupervised training procedure In certain embodiments, some or all of the aforementioned functions can be executed by the similarity model 320, price band determination model 360, affinity prediction model 370, and/or ranking engine 380 included in the machine learning architecture 350.

According to certain embodiments, the price band determination model 360 can perform any and all functions described herein with respect to assessing or determining the expensiveness of items 310. Defining or determining what constitutes a high-priced or low-priced item is a technically difficult problem. While items 310 can be associated with a specific price, the absolute value of the price tag is not sufficient to determine whether an item 310 is considered expensive or inexpensive. For example, while $100 may be a bargain for a laptop, the same price tag for a light bulb may be very expensive. The price band determination model 360 can overcome this technical hurdle by implementing machine learning technologies and/other analysis techniques to subjectively assess the prices of items 310 relative to particular item categories 315, and subsequently leverage this knowledge to enhance the outputs 395 of end-user applications 390.

In certain embodiments, price band determination model 360 can be configured to learn a plurality of price bands 365 for each of a plurality of item type categories 315. Each price band 365 for an item type category 315 may indicate and/or represent a separate degree of expensiveness of items 310 included in a particular item type category 315. Each item 310 included in an item type category 315 may be assigned to one of the price bands 365 (e.g., based on the price at which the item 310 is offered for sale on the electronic platform 330) to indicate the relative expensiveness of the item 310.

The number of price bands 365 computed for each item type category 315 may vary. For example, in certain embodiments, the price band determination model 360 can be configured to learn five price bands 365 (e.g., very low, low, medium, high, and very high) for each item type category 315. In other cases, the price band determination model 360 can be configured to learn three price bands 365 (e.g., low, medium, and high) for each item type category 315. Other numbers of price bands 365 also may be utilized.

Regardless of how many price bands are utilized or learnt, each price band 365 may be associated with a price range (e.g., low=$1-$10, medium=$10.01-$30, and high=$30.01+). The price band determination model 360 can be configured to analyze the taxonomy information, item type categories 315, and/or metadata associated with items 310 (e.g., including prices for the items 310) to learn the boundaries for the price bands 365 in each item type category 315. The price band determination model 360 also can be configured to assign each item 310 included in an item type category 315 to one of the price bands 365 associated with that item type category 315.

The manner in which the price band determination model 360 learns and/or determines the price bands 365 can vary. Exemplary techniques for learning and/or determining price bands 365 can include clustering methods, transactional balancing methods, and/or statistical methods. Each of these techniques are described in further detail below with reference to FIGS. 4 and 5. Other techniques also can be utilized to implement the functionality of the price band determination model 360.

The prices bands 365 generated for the item type categories 315, and the assignment of items 310 to the various price bands 365, can be utilized in various ways to enhance the outputs 395 of the end-user applications 390. For example, in certain embodiments, this information may be utilized to recommend items 310 in particular price bands 365, select and/or rank search results to present items 310 in particular price bands 365, and/or select and/or rank advertisements corresponding to items 310 in particular price bands 365.

As mentioned above, the machine learning architecture 350 also may include an affinity prediction model 370. In certain embodiments, the affinity prediction model 370 can be configured to generate and/or determine price affinity predictions 375. In some cases, the price affinity predictions 375 may indicate and/or predict the probability that a user 305, or group of users 305, will purchase an item 310 from a particular price band 365 for a given item type category 315.

For many users 305, price is often a key factor for purchasing items 310. In many cases, users 305 tend to make price-value tradeoffs when they purchase items 310, and their behavior can vary widely depending on demographic factors (e.g., such as their salary, location, etc.) and psychological factors (e.g., such as money consciousness and/or additional interest in particular types of items).

Consider an example involving purchasing choices for two different users. The first user is a sound engineer seeking to purchase high-quality headphones for use at work. Because this user needs to discern any imperfections in sound quality, the user may be looking to purchase expensive headphones. On the other hand, a second user may decide to purchase headphones for the primary purpose of listening to podcasts. As long as this user can understand the podcast, sound quality is not a significant concern and the user is willing to buy lower-priced headphones. To effectively personalize their shopping experience, understanding that the first user is seeking higher priced headphones and the second user is seeking lower priced headphones can be important. However, configuring an electronic computing system to understand these issues can be technically complex and challenging.

To address these and other technical obstacles, the affinity prediction model 370 can be configured to analyze and learn user activity patterns (e.g., stored in the historical usage data 311) with respect to purchasing and/or interacting with items 310 included in price bands 365 for various item type categories 315. The affinity prediction model 370 can then utilize the learnt information to generate price affinity predictions 375, which may be used to predict the probability that a user will purchase an item from a particular price band 365 versus other price bands 365 for a corresponding item type category 315. In turn, the price affinity predictions 375 can be used to generate, select, and/or rank outputs 395 (e.g., item recommendations, search results, and/or advertisements) in a manner that increases relevance and precision of the outputs 395, and personalizes the outputs 395 for users 305.

The manner in which the affinity prediction model 370 generates the price affinity predictions 375 can vary. Exemplary techniques for learning user activity patterns and/or generating price affinity predictions 365 can utilize multi-class logistic regression (LR) models and/or decision tree (DT) models. These exemplary techniques are described in further detail below with reference to FIGS. 4 and 6. Other techniques also can be utilized to implement the functionality of the affinity prediction model 370.

The similarity model 320 can be configured to learn item-item similarity in a manner that considers the price bands 365 assigned to items 310. The similarity model 320 may analyze and/or utilize the historical usage data 311 to determine correlations between item purchases in separate item type categories 315 and corresponding price bands 365 for those items 310. The similarity model 320 can utilize these learned correlations to compute or determine item-item price similarity scores across items 310 included in different item type categories 315.

In one example, an analysis of the historical usage data 311 may indicate that users who purchase televisions in a medium-priced price band 365 have a relatively high probability of purchasing sound bars in a high-priced price band 365. The similarity model 320 can identify these types of correlations and generate similarity scores that reflect or capture this item-item price similarity. The similarity scores generated by the similarity model 320 then can be used to generate, select, and/or rank outputs 395 (e.g., item recommendations, search results, and/or advertisements) in a manner that increases relevance and precision of the outputs 395, and personalizes the outputs 395 for users 305.

The manner in which the similarity model 320 learns the item-item correlations and generates the similarity scores can vary. Exemplary techniques for performing these functions can utilize Pearson correlation and matrix factorization models. These exemplary techniques are described in further detail below with reference to FIG. 4. Other techniques also can be utilized to implement the functionality of the similarity model 320.

As mentioned above, the machine learning architecture 350 also may including a ranking engine 380. The ranking engine 380 can be configured to generate relevance scores for selecting items 310 to be included in the outputs 395 of the end-user applications 390 and/or for ordering or ranking the selected outputs 395 of the end-user applications 390.

The ranking engine 380 may be particularly useful for embodiments in which one or more end-user applications 390 are configured to recommend items 310 to users 305. For example, the ranking engine 380 may receive multiple features as inputs for ranking item recommendations, and the ranking engine 380 may utilize these inputs to generate relevance scores for each of the candidate item recommendations. The relevance scores may then be utilized to select and order the items 310 that are presented to users 305 as recommendations.

The ranking engine 380 also may be utilized to generate relevance scores for other types of end-user applications 390. For example, in certain embodiments, the relevance scores generated by the ranking engine 380 may be utilized to select, order, and/or rank advertisements and/or search results that are generated by the end-user applications 390.

The ranking engine 380 can generate the relevance scores for items based on various input features. In certain embodiments, input features utilized to generate the relevance scores includes metrics generated by the price band determination model 360, affinity prediction model 370, and/or similarity model 320. For example, in certain embodiments, the price affinity predictions 375 generated by the affinity prediction model 370 may be utilized as an input feature to generate the relevance scores. Likewise, the item-item price similarity scores generated by the similarity model can additionally, or alternatively, be utilized as an input feature to generate the relevance scores.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing an electronic platform 330, machine learning architecture 350 (and associated sub-components), and one or more end-user applications 390. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 310 (e.g., products and/or services) that are offered or made available via the electronic platform 330. For example, for each item 310, metadata 411 associated with the item 310 can include any or all of the following: an item name or title, an item type category 315 associated with the item, a price 412, one or more customer ratings for the item, an item description, images corresponding to the item, a number of total sales, and various other data associated with the item. The metadata 411 for each item 310 also may be supplemented to include an expensiveness indicator that identifies a price band 365 that has been associated with the item 310 and/or that identifies the expensiveness of the item 310 relative to other items in the same item type category 315.

The one or more databases 410 also may store the historical usage data 311 which, as mentioned above, can include any data associated with users' interactions with the electronic platform (e.g., such as items that are viewed, selected, purchased, and/or added to a digital shopping cart). The one or more databases 410 also can store taxonomy information, including data that identifies item type categories 315, associated with classifying or labeling the items 310 offered on the electronic platform 330.

As mentioned above, the machine learning architecture 350 may include and/or execute one or more machine learning techniques in connection with implementing the price band determination model 360, affinity prediction model 370, similarity model 320, and/or ranking engine 380. In certain embodiments, each of these components may execute a separate learning procedure 420 that is trained to perform the functions associated with these components. Any appropriate training procedure 420 may be utilized to train the price band determination model 360, affinity prediction model 370, similarity model 320, and/or ranking engine 380. The training procedures 420, which can enable these components to learn and/or execute their corresponding functions, can include any supervised, semi-supervised, and/or unsupervised training procedure 420. Exemplary training procedures 420 for each of these components are described in further details below.

As mentioned above, the price band determination model 360 can be configured to generate and/or identify one or more price bands 365 for each item type category 315, and items 310 associated with each item type category 315 can be assigned to price bands 365 to indicate their relative expensiveness. In certain embodiments, the price band determination model 360 can execute one more unsupervised methods and/or training procedures 420 to learn, determine and/or identify the price bands 365.

FIG. 5 is a block diagram illustrating an exemplary system 500 for implementing the price band determination model 360. In certain embodiments, the price band determination model 360 may utilize a clustering model 510, transaction balancing model 520, and/or a statistical model 530 to determine and/or identify the price bands 365. Other types of machine learning models also may be utilized to implement the price band determination model 360.

To segment or divide the items 310 from an item type category 315 into separate price bands 365, the clustering model 510 can be configured to assign items into clusters 513 using the prices 412 associated with the items 310. Exemplary clustering models 510 may include a K-Means model 511 or a Gaussian mixture model 512. As explained below, the K-Means model 511 and/or Gaussian mixture model 512 can be trained using an unsupervised training procedure 420.

With respect to the K-Means model 511, each item included in an item type category can be assigned to a cluster 513 for which the mean price value is closest to the item price 412. Given a set of price values for a certain item type $(x_1, x_2, \ldots, x_n)$, k-means clustering aims to partition the price values into $k(\leq n)$ clusters or price bands PB={$PB_1$, $PB_2$, \ldots, $PB_k$} to minimize the within-cluster sum of squares (WCSS). The K-Means model 511 can execute an assignment function and update function to accomplish this goal, as explained below.

Assignment Function: The assignment functions assigns each item to the cluster (PB) with mean price value $(m_i^{(t)})$ having the least squared difference with the item price value $(x_p$ for $1 \leq p \leq n)$. The assignment function may utilize Equation 1 to perform this step.

$$PB_i^{(t)} = \{x_p : (x_p - m_i^{(t)})^2 \leq (x_p - m_j^{(t)})^2 \forall j, 1 \leq j \leq k\} \qquad (1)$$

wherein:

$PB_i^{(t)}$ denotes the set of item prices in price band i at step t;

$x_p$ denotes the price value of item p for $1 \leq p \leq n$; and $m_i^{(t)}$ denotes the mean price value of price band i at step t.

Update Function: The update function recalculates mean price values (centroids)—$m_i^{(t+1)}$—using prices for items assigned to each cluster. The update function may utilize Equation 2 to perform this step.

$$m_i^{(t+1)} = 1/|PB_i^{(t)}| \Sigma_{x_j \in PB_i^{(t)}} x_j \qquad (2)$$

wherein:
- $m_i^{(t+1)}$ denotes the mean price value of price band i at step t+1;
- $|PB_i^{(t)}|$ denotes the number of elements in price band i at step t; and
- $x_j$ denotes an item price belonging to price band i at step t.

In certain embodiments, the K-Means model 511 can be configured to repeat the above functions for a fixed number of iterations. Alternatively, the K-Means model 511 can be configured to repeat the above functions until it is detected that there is little change in the clusters 513 and/or until it detects that the WCSS falls below a certain threshold. The cluster 513 having the lowest mean can be considered the first price band 365, the cluster having the second lowest mean can be considered the second price band 365, and so on. The $k^{th}$ price band can represent the cluster having the highest mean price. The K-Means model 511 can therein generate the price bands 365 in this manner.

Alternatively, or additionally, a Gaussian mixture model 512 can be utilized to generate the price bands 365. The Gaussian mixture model 512 can be configured to assume that all the price values (x) are generated from a mixture of a finite number (k) of normal distributions with unknown means ($\mu_i$) and variances ($\sigma_i$) such that the probability (P) of price x being generated by component i is $\phi_i$ (where parameters are estimated using Expectation Maximization). The Gaussian mixture model 512 may utilize Equations 3, 4, and 5 to generate the price bands 365.

$$P(x) = \Sigma_{i=1}^{k} \phi_i N(x|\mu_i, \sigma_i) \quad (3)$$

$$N(x|\mu_i, \sigma_i) = 1/\sigma_i\sqrt{2\pi} \exp(-(x-\mu_i)^2/2\sigma i^2) \quad (4)$$

$$\Sigma_{i=1}^{k} \phi_i = 1 \quad (5)$$

wherein:
- k denotes the number of clusters/components;
- P(x) denotes the probability of price x being generated from the mixture of Gaussians;
- $\phi_i$ denotes the probability of price being generated by component I;
- $N(x|\mu_i, \sigma_i)$ denotes the Gaussian probability distribution function (pdf);
- $\mu_i$ denotes the mean of the $i^{th}$ component; and
- $\sigma_i$ denotes the standard deviation of the $i^{th}$ component.

Using the above equations, the Gaussian mixture model 512 can be configured to select the cluster 513 having the highest probability as the item's price band 365, and this determination can be made for each item 310.

A transaction balancing model 520 may alternatively, or additionally, be used to determine the price bands 365 and to assign items to the price bands 365. In certain embodiments, the transaction balancing model 520 may generate the price bands 365 using a technique that spreads the transaction volumes 525 for each item type category 315 equally or substantially equally among the price bands 365.

In certain embodiments, the transaction balancing model 520 can be configured to compute cumulative transaction volumes 525 (e.g., total number of item purchases up to that item) after arranging items for each item type category 315 in increasing order of their price value, and determining price band boundaries such that each price band accounts for an equal volume of item transactions. This technique can be utilized to mitigate data imbalance (e.g., when using price bands to compute price affinities based on user activity as described in further detail below).

Given items 310 from a particular item type category 315 with price values $(x_1, x_2, \ldots, x_n)$ sorted in ascending order and numbers of transactions for each item in the same order $(t_1, t_2, \ldots, t_n)$, the transaction balancing model 520 creates k partitions $PB = \{PB_1, PB_2, \ldots PB_k\}$ such that the number of transactions in $PB_1$ equals (or almost equals) the number of transactions in $PB_2$, which equals (or almost equals) the number of transactions in $PB_k$. For instance, let the sum of all transactions $\Sigma_{i=1}^{n} t_i = T$ and cumulative sums of transactions be $(c_1, c_2, \ldots, c_n)$, i.e., $c_1 = t_1$ and $c_n = T$. The transaction balancing model 520 may then utilize Equations 6 and 7 to generate the price bands 365.

$$c_p = \Sigma_{j=1}^{p} t_j \quad (6)$$

$$PB_i = \{x_p : c_p \leq i*T/k \text{ and } c_p \geq (i-1)*T/k\} \text{ for } 1 \leq p \leq n \quad (7)$$

wherein:
- $c_p$ denotes cumulative sum of transactions upto item p (ordered by price);
- $t_j$ denotes number of transactions for item j (ordered by price);
- $PB_i$ denotes the set of item prices in price band i;
- $x_p$ denotes the price value of item p for $1 \leq p \leq n$;
- T denotes the sum of all transactions for that item type; and
- k denotes the number of price bands.

A statistical model 530 may alternatively, or additionally, be used to determine the price bands 365. Exemplary statistical models 530 that may be utilized can include a range-based statistical model 531 and/or a percentile-based statistical model 352.

The range-based statistical model 531 can be configured to determine price bands 365 by segmenting prices 412 from a certain item type category 315 into ranges based on experimentally determined ratios (equal or unequal). For example, given a scenario in which item prices in an item type category vary from $100 to $5100 and it is desired to segment the items in this item type category into three price bands 365, the price bands 365 may be created with price range ratios 3:5:2. In this scenario, one unit of the range becomes ($5100-$100)/(3+5+2)=$500, the lowest price band 365 extends from $100 to $1600 ($100+3*$500), the middle price band 365 extends from $1600 to $4100 ($2600+5*$500), and the highest price band 365 extends from $4100 to $5100 ($4100+2*$500).

The percentile-based statistical model 532 can be configured to determine price bands 365 based on percentiles of items 310 in item type category 315. For example, staying with above example (in which it is desired to segment the items in the item type category into three price bands 365), the percentile-based statistical model 532 can create three price bands 365 with percentiles 30%, 50% and 20%. For example, if there are two hundred items 310 in the item type category 315 with sixty items 310 having a price less than $500, one hundred items having a price between $500-$2500, and forty items 310 having a price greater than $2500, then those percentiles can be used to delineate the price bands 365.

The clustering models 510, transaction balancing models 520, and statistical models 530 described above are provided as examples of how the price band determination model 360 can determine price bands 365 and/or assign items to the price bands 365. Other techniques and functions also can be utilized by the price band determination model 360 to perform these functions.

Regardless of the technique which is utilized to identify the price bands 365, each price band 365 can be associated with price range boundaries 516 indicating a range of prices associated with the price band 365. The price range boundaries 516 for a price band 365 may include an upper and lower price band boundary 516. For example, for an item type category 315 that is segmented into three price bands 365, a first price band 365 may be associated with price range boundaries 516 spanning from $5-20 (inexpensive), a second price band 365 may be associated with price band boundaries 516 spanning from $20.01-$50 (medium-price), and a third price band 365 may be associated with price band boundaries spanning from $50.01-$200 (expensive). After the price bands 365 (and their corresponding price range boundaries 516) have been determined, each item 310 included in the item type category 315 may be assigned to the appropriate price band 365 that includes price range boundaries 516 encompassing the sale price 412 of the item 310.

In certain embodiments, the price band determination model 360 can store and/or associate expensiveness indicators 515 with each of the items 310 (e.g., with metadata 411 associated with the items 310). Each expensiveness indicator 515 can identify a price band 365 that is associated with the item 310 and/or can indicate a degree of expensiveness for the item 310 relative to other items included in the same item type category. In certain embodiments, the expensiveness indicators 515 may include labels, values, or identifiers that identify the price bands 365 assigned to the items 310. These expensiveness indicators 515 can then be used in connection with various end user applications 390 (FIGS. 3 & 4) to personalize outputs (e.g., such as recommendation results, search results, advertisements, etc.) that are presented to the users.

Returning to FIG. 4, the affinity prediction model 370 can be configured to generate and/or determine price affinity predictions 375, which can indicate and/or predict the preferences and/or affinities of users 305 with respect to particular price bands 365 for each of the item type categories 315. In certain embodiments, the price affinity predictions 375 can be utilized to determine or predict whether a user 305 is likely to purchase an item 310 from a particular price band 365 for a given item type category 315.

For example, given a scenario involving two price bands (e.g., "expensive" and "cheap"), the affinity prediction model 370 may determine that a specific user 305 might have affinities 0.8 and 0.2 towards expensive and cheap fitness trackers, but 0.3 and 0.7 towards expensive and cheap bed frames. These price affinity predictions 375 can indicate that the user 305 prefers to purchase expensive fitness trackers, but inexpensive bed frames. These price affinity predictions 375 then can be used in connection with various end user applications 390 to personalize outputs 395 (e.g., recommendation results 491, search results 492, advertisements 493, etc.) that are presented to the user.

The manner in which the affinity prediction model 370 generates these price affinity predictions 375 can vary. Exemplary configurations for generating these price affinity predictions 375 are described below.

Figure 6:
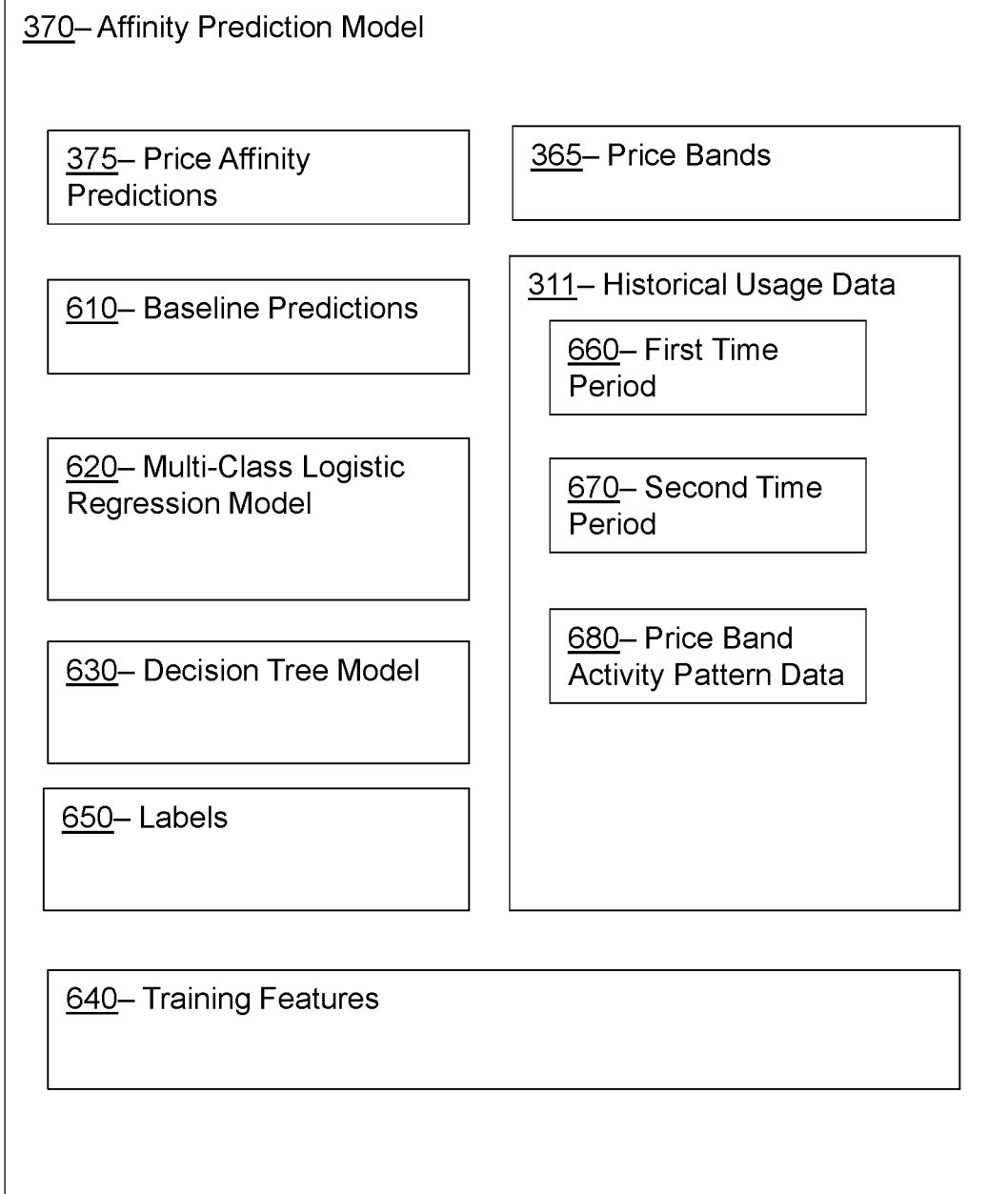
FIG. 6 illustrates a representative block diagram of a portion of the system of FIGS. 3 and 4, according to an embodiment.

FIG. 6 is a block diagram illustrating an exemplary system 600 for implementing the affinity prediction model 370. The price affinity predictions 375 generated by the affinity prediction model 370 may be represented as a numerical value within a particular range (e.g., 0.0-1.0). A price affinity prediction 375 falling on a low end of the range (e.g., 0.0-0.2) may indicate a low likelihood that a user will purchase an item associated with a particular price band for a given item type category. A price affinity prediction 375 falling on a high end of the range (e.g., 0.7-1.0) may indicate a high likelihood that a user would purchase an item associated with a particular price band for a given item type category.

In certain embodiments, the affinity prediction model 370 may utilize the historical usage data 311 to train one or more machine learning models to generate baseline predictions 610 and price affinity predictions 375. In certain embodiments, the baseline predictions 610 can be used as a basis for comparison against the price affinity predictions 375 generated by a multi-class logistic regression model 620 and/or a decision tree model 630, which are described in further detail below. Experiments have demonstrated that the price affinity predictions 375 generated by the multi-class logistic regression model 620 and decision tree model 630 are more accurate and precise than the baseline predictions 610.

To generate the baseline predictions 610, the affinity prediction model 370 may utilize historical usage data 311 for a first time period 660 (e.g., a 6-month period). For example, for each user per item type category, the number of transactions (trx) in each price band ($pb_i$) can be normalized by summing transactions across all price bands for that item type ($pt_j$) and user to obtain affinity scores for the baseline predictions 610 using Equation 8 below.

$$\text{user\_price\_affinity}_{(pb_i, pt_j)} = \frac{\text{\# of } trx \text{ in } pb_i, pt_j}{\text{\# of } trx \text{ in } pt_j} \quad (8)$$

wherein:
$pb_i$ denotes price band i;
$pt_j$ denotes item type j;
# denotes number;
trx denotes transactions; and
$pb_i$, $pt_j$ indicates $pb_i$ and $pt_j$.

In some cases, the baseline predictions 610 can serve as a measure to evaluate the improvement in accuracy of the price affinity predictions 375.

A supervised training procedure 420 (FIG. 4) can be utilized to train the multi-class logistic regression model 620 and a decision tree model 630 to generate the price affinity predictions 375. Predicting the price affinity predictions 375 can be considered a multi-class classification problem with number of classes equal to the number of price bands (n).

To assist with training the multi-class logistic regression model 620 and a decision tree model 630, the affinity prediction model 370 initially can utilize the historical usage data 311 to generate training features 640 and labels 650. For example, in some cases, price affinity predictions 375 may utilize the historical usage data 311 from a first time period 660 (e.g., a previous 6-month period of transaction data) to generate training features 640 and the historical usage data 311 from a second time period 670 (e.g., a 1-month period immediately following the 6-month period) to generate labels 650. The durations or time spans associated with the first time period 660 and second time period 670 can vary and may generally include any appropriate period of time sufficient to facilitate training.

For each user and item type category, a set of training features 640 can be extracted from the historical usage data 311. The extracted features may include price band activity data 680 for each user with respect to items 310 included in each price band 365 of an item type category. The price band activity data 680 can include any data that indicates users' activity patterns with respect to price bands for item type categories and/or any data that indicates users' interactions on the electronic platform with items included in the price bands 365. For example, for each user per item type category, the price band activity pattern data 680 may include some or all of the following: the number of transactions or purchases by the user in each price band associated with the item type category; the number of times the user added items to a digital shopping cart in each price band associated with the item type category; and/or the number of item views (e.g., the number of times the user accessed a GUI pertaining to items) in each price band for the item type category. Some or all of the price band activity data 680 may be utilized as training features 640. Other relevant training features 640 also may be utilized.

In certain embodiments, the training features 640 can be calculated on a monthly basis using the historical usage data 311 and/or price band activity data 680 for the first time period (e.g., a previous 6-month time period and/or other time period). For example, each training feature 640 may include a monthly total of the number of transactions, add to cart selections, and/or views for items in a particular price band 365 for a particular item type for a month within a 6-month time period and/or other time period. In certain embodiments, each training feature 640 can be represented as a multi-dimension vector or data point that incorporates or represents these values associated with the transactions, add to cart selections, views, and/or other historical usage data 311.

Because ground-truth data may not be available for labeling in certain scenarios, labels 650 can be generated using the historical usage data 311 and/or price band activity data 680. For example, the price band having the maximum number of transactions by the user for a particular item type category can be selected for use as the label 650 for that category. The aggregation of historical usage data 311 for the labels 650 can be selected from a second time period 670 that occurred after the first time period 660 (e.g., using the data for the month immediately following the last month used for obtaining the training features 640).

A plurality of separate input data point pairs (each of which includes a training feature vector x and a label y) can be used to train the multi-class logistic regression model 620 and/or a decision tree model 630 to generate price affinity predictions 375 for a specific user towards different price bands in a particular item type category. For each of the input data point pairs, the multi-class logistic regression model 620 can be configured to learn weights (e.g., a weight vector w) and output a probability distribution over the price bands (pb) for a given user and item type category (pt) which represents the user's affinity (e.g., the price affinity prediction 375). This can be performed using Equation 9 below.

$$\text{user\_price\_affinity}_{(pb_i, pt_j)} = \frac{\exp w_i^T x}{\sum_{k=1}^{K} \exp w_k^T x} \quad (9)$$

wherein:
- $pb_i$ denotes price band i;
- $pt_j$ denotes item type j;
- $w_i$ denotes the weight vector for class/price band i;
- x denotes the input feature vector; and
- K denotes the number of classes/price bands.

Two different variants may be used: (1) unweighted (LR-unbal); and/or weighted (LR-bal) based on class imbalance. Regarding the latter, each data point can be assigned a weight while contributing to a loss/gradient computation. The weight balancing heuristic used can be inversely proportional to class frequencies:

$$\frac{n\_samples}{n\_classes * count\_y}$$

where y is the class label.

The decision tree model 630 can alternatively, or additionally, be utilized to determine the price affinity predictions 375. The decision tree model 630 can be configured to continuously split the data used for classification into different nodes based on a feature and threshold chosen to minimize impurity and/or maximize purity at each step. In certain embodiments, Gini Impurity and/or Information Gain (from entropy) techniques may be used to determine these measurements.

For example, assuming price affinity predictions 375 are being predicted for k price bands, and let $p_i$ be the fraction of labels with price band i, then the following equations can be used:

$$\text{Gini Impurity}, I_G(p) = \Sigma_{i=1}^{k} p_i(1-p_i) = 1 - \Sigma_{i=1}^{k} p_i^2 \quad (10)$$

$$\text{Entropy}, H(T) = \Sigma_{i=1}^{k} p_i \log_2 p_i \quad (11)$$

$$\text{Information Gain}, IG(T) = H(T) - H(T|A) \quad (12)$$

wherein:
- $p_i$ denotes the fraction of labels with price band i in the node; and
- k denotes the number of price bands.

The other variables are defined in other portions of this disclosure.

In the above, H(T) corresponds to the entropy of the parent node and H(T|A) is the weighted sum of entropy of child nodes given the split. The split that minimizes Gini Impurity and/or maximizes Information Gain is chosen for growing the tree. This tree split process performed by the decision tree model 630 can be repeated until the tree reaches a pre-specified maximum depth, until the minimum number of points in a node is below a certain value, and/or until the impurity is low enough to stop splitting (hyperparameters).

In certain embodiments, random forests and fitting multiple decision trees techniques can be used on a number of smaller samples from the data. The final output label, in this case, can be the majority label from an average of the different tree outputs.

Returning to FIG. 4, the similarity model 320 can be configured to learn and determine the similarity between price bands for items 310 across different item type categories 315 based on user transaction patterns. In certain embodiments, the similarity model 320 can analyze the aggregated historical usage data 311 across some or all of the users 305 to learn item-item price similarity scores 425. The item-item price similarity scores 425 can indicate the similarity between a pair of items 310 in a manner that considers the price bands 365 associated with both items 310 in the pair.

In certain embodiments, the item-item price similarity scores 425 may be represented as a numerical value within a particular range (e.g., 0.0-1.0). An item-item price similarity score 425 falling on a low end of the range (e.g., 0.0-0.2) may indicate a lack of similarity between the items 310 associated with a particular price band and item type, and/or that the items are not likely to be purchased together. An item-item price band similarity score 425 falling on a high end of the range (e.g., 0.7-1.0) may indicate that items 310 included in a particular item pair are similar in terms of price and/or that there is a high likelihood that the items are purchased together.

For example, an analysis of transactions included in the historical usage data 311 may indicate that users who purchase computers in an expensive price band 365 also tend to purchase tablets in an expensive price band 365. In another example, an analysis of transactions included in the historical usage data 311 may indicate that users who purchase mattresses in an expensive price band also tend to purchase bed frames in a cheap price band.

The manner in which the similarity model 320 generates these item-item price similarity scores 425 can vary. In certain embodiments, the similarity model 320 may utilize a Pearson correlation model 421 and/or a matrix factorization model 422 to generate the price similarity scores 425. Exemplary configurations for generating these price similarity scores 425 are described below.

For embodiments that include a Pearson correlation model 421, the Pearson correlation (φ between observed transactions can be computed for each user for different item type-price band pairs ($pt_a$, $ph_i$ and $pt_b$, $pb_j$), and these correlations can be used to represent the item-item price similarity scores 425. Equation 13 can be used to compute the item-item price similarity scores 425 in this manner.

$$\text{price2price} = \rho_{X,Y} = \frac{\text{cov}(X, Y)}{\sigma_X * \sigma_Y} \quad (13)$$

wherein:
$\rho_{X,Y}$ denotes the Pearson correlation coefficient between sequences X and Y (aggregated customer transactions in different item type-price band pairs);
cov(X, Y) denotes the covariance between sequences X and Y; and
$\sigma_X$ denotes the standard deviation of sequence X.

For embodiments that include a matrix factorization model 422, this model can learn latent representations for item type-price band pairs by creating a user-based item type-price band pairs transaction matrix and factorizing it. In this context, $U^{m \times d}$ denotes the user representation (m users) and $V^{n \times d}$ denotes the (item type, price band) representation (n pairs). Embeddings are learned such that $UV^T$ is a good approximation of transaction matrix T. Cosine similarity between these low-dimensional vectors can be used as the item-item price similarity scores 425 as demonstrated by Equation 14.

$$\text{price2price} = \cos(\theta) = \frac{u \cdot v}{\|u\| \|v\|} \quad (14)$$

u denotes the latent user vector learnt using Matrix Factorization;
v denotes the latent item type-price band vector learnt using Matrix Factorization;
u·v denotes the dot product between u and v; and
$\|u\|$ denotes the L2 norm of u.

Returning to FIG. 4, the ranking engine 380 can be configured to receive a set of input features 481, and utilize the input features 481 to generate relevance scores 482 that are used to rank or order a listing of ranking results 483. The ranking results 483 may correspond to outputs 395 provided by one or more end-user applications 390. For example, in certain embodiments, the ranking results 483 may include a listing of recommendation results 491 provided by an end-user application 390 that recommends items 310 to users (e.g., recommended items that are presented on a GUI that shows items commonly purchased or viewed together). The ranking results 483 also may correspond to search results 492, advertisements 493, and/or other outputs 395 provided by the end-user applications.

The input features 481 utilized by the ranking engine 380 can vary. In certain embodiments, the ranking engine 380 may utilize outputs generated by the price band determination model 360, affinity prediction model 370, and/or similarity model 320 to compute the relevance scores 482 and order the ranking results 483. For example, in certain embodiments, the input features 481 can include the price affinity predictions 375 generated by the affinity prediction model 370 and/or the item-item price similarity scores 425 generated by the similarity model 320 to generate the relevance scores 482. These and other input features 481 can be used to rank or order the ranking results 483.

The description below demonstrates an exemplary configuration for an embodiment of the ranking engine 380 that utilizes the price affinity predictions 375, item-item price similarity scores 425, and other input features to generate ranking results 483 for an end-user application 390 that generates recommendation results 491.

In certain embodiments, the ranking engine 380 comprises an inference function that can be used to combine input features 481 including the price affinity predictions 375 and item-item price similarity scores 425. The inference function can utilize Equation 15 to generate relevance scores 482 that predict user-item interactions.

$$P(u \text{ interacts with } r|u \text{ just interacted with } i) = f(g(u,r), h(i,r)) \quad (15)$$

wherein:
u is the user, i is the anchor item, r is the recommended item, g(u, r) represents u's preference for r, and h(i r) represents item relevance between i and r.

In certain embodiments, the inference function can use logistic regression where user preference score and relevance score are combined linearly. The weights can be learned either at a global level (e.g., such that the same weights are used across all item types) or at the item type level.

Various tests were conducted to evaluate how the price understanding models perform when implemented on an end-user application 390 that presents recommendation results 491 (e.g., for a section of a GUI labeled "customers who viewed also viewed" (VAV)). The system retrieved a few million anchor items from VAV and was configured to limit (IV<=30) recommendations for each item ranked by a relevance score 482. This relevance score 482 is based on item-item features such as number of co-views, title match and popularity. The price understanding model offers two additional features for re-ranking on top of the relevance score 482: price affinity predictions 375 and item-item price similarity scores 425

Various methods used to generate the price bands 365 and price affinity predictions 375 also were tested, including two of the price band methods described above for k-means clustering and transaction balancing. For each item price banding model, four variations of price affinity predictions 375 are predicted: baseline, logistic regression (unbalanced), logistic regression (balanced) and decision trees. This provides a total of eight versions of user price affinity predictions 375. The inference function for re-ranking can include balanced logistic regression:

$$y = w_0 + w_1 \times \text{relevance} + w_2 \times \text{user\_price\_affinity} \quad (16)$$

wherein:
y denotes the predicted score for re-ranking;
$w_0$ denotes the bias; and
$w_1$ and $w_2$ denote feature weights.

The weights in the equation above can be trained at the global level (as opposed to at each item-type level) and can be optimized for items that are co-viewed within each user session. To evaluate performance, ranking evaluation metrics such as Normalized Discounted Cumulative Gain (NDCG), Mean Hit Rate (MHR), Mean Reciprocal Rank (MRR) and Mean Average Precision (MAP) may be utilized. The evaluation metrics can be limited to the top five recommendation results in some cases. All models outperform the relevance only model (no re-ranking). In some experiments, the best performing model included transaction balancing for generating price bands 365 and weighted logistic regression (balanced) to derive price affinity predictions 375.

Subsequent experiments expanded on these models and supplemented the models with item-item price similarity scores 425 computed between the anchor item and the recommended item. Two variations of item-item price similarity scores 425 were compared based on the Pearson correlation model 421 and matrix factorization model 422. In this scenario, the inference function can consider the item-item price similarity score 425 as an additional feature, as follows:

$$y=w_0+w_1\times\text{relevance}+w_2\times\text{user\_price\_affinity}+w_3\times\text{price2price\_similarity} \quad (17)$$

wherein:
y denotes the predicted score for re-ranking;
$w_0$ denotes the bias; and
$w_1$, $w_2$ and $w_3$ denote feature weights.

Again, a balanced logistic regression model can be used to train the above objective function and learn the weights at the global level. Results demonstrated an even greater boost in performance by adding the feature for the item-item price similarity scores 425. In certain experiments, the best performing model used the item-item price similarity scores 425 derived from the matrix factorization model 422. Experiments also studied the weights, $w_1$ $w_2$ $w_3$ from the inference function to gauge feature importance. After adjusting for feature variance (using standard scaling of features), the following ratio among the weights may be used in certain embodiments: w1:w2:w3=33:3:1.

FIG. 7 illustrates a flow chart for an exemplary method 700, according to certain embodiments. Method 700 is merely exemplary and is not limited to the embodiments presented herein. Method 700 can be employed in many different embodiments or examples not specifically depicted or described herein. In some embodiments, the activities of method 700 can be performed in the order presented. In other embodiments, the activities of method 700 can be performed in any suitable order. In still other embodiments, one or more of the activities of method 700 can be combined or skipped. In many embodiments, system 300 (FIGS. 3-4), system 500 (FIG. 5), electronic platform 330 (FIGS. 3-4), and/or machine learning architecture 350 (FIGS. 3-4) can be suitable to perform method 700 and/or one or more of the activities of method 700. In these or other embodiments, one or more of the activities of method 700 can be implemented as one or more computer instructions configured to run at one or more processing modules and configured to be stored at one or more non-transitory memory storage modules. Such non-transitory memory storage modules can be part of a computer system such as system 300 (FIGS. 3-4), system 500 (FIG. 5), electronic platform 330 (FIGS. 3-4), and/or machine learning architecture 350 (FIGS. 3-4). The processing module(s) can be similar or identical to the processing module(s) described above with respect to computer system 100 (FIG. 1).

In many embodiments, method 700 can comprise an activity 710 of providing a machine learning architecture that is configured to evaluate expensiveness of items included in an item type category relative to each other. The item type category may represent a specific category of products and/or services offered by an electronic platform, and can include various items with varying prices.

Method 700 can further comprise an activity 720 of receiving prices associated with the items included in the item type category.

Method 700 can further comprise an activity 730 of generating a plurality of price bands based, at least in part, on the prices associated with the items. The price bands may be generated or identified using a price band determination model associated with the machine learning architecture. Each of the plurality of price bands can be associated with separate price range boundaries for the items included in the item type category. Thus, the price bands and their corresponding price range boundaries may be used to indicate the relative expensiveness of items included in the item type category. The price band determination model can use various techniques (e.g., transaction balancing, clustering, and/or statistical techniques) to identify the price bands.

Method 700 can further comprise an activity 740 of assigning each of the items to one of the plurality of price bands. As mentioned above, each item may be assigned to the price band that includes a price range boundary that encompasses the price of the item.

Method 700 can optionally comprise an activity 750 of customizing or personalizing outputs of one or more end-user application based, at least in part, on the assignments of items to the plurality of price bands. Exemplary outputs that may be customized can include recommendation results, search results, and/or advertisements.

FIG. 8 illustrates a flow chart for an exemplary method 800, according to certain embodiments. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIGS. 3-4), system 500 (FIG. 5), system 600 (FIG. 6), electronic platform 330 (FIGS. 3-4), and/or machine learning architecture 350 (FIGS. 3-4) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 300 (FIGS. 3-4), system 500 (FIG. 5), system 600 (FIG. 6), electronic platform 330 (FIGS. 3-4), and/or machine learning architecture 350 (FIGS. 3-4). The processing module(s) can be similar or identical to the processing module(s) described above with respect to computer system 100 (FIG. 1).

In many embodiments, method 800 can comprise an activity 810 of determining price bands for an item type category using a price band determination model of a machine learning architecture.

Method 800 can further comprise an activity 820 of associating items included in the item type category with the price bands.

Method 800 can further comprise an activity 830 of analyzing price band activity data indicating a user's interactions with respect to the items included in each of the price bands for the item type category. The price band activity data may be utilized to ascertain or understand user activity patterns with respect to particular price bands. For example, the price band activity data may indicate items that are commonly viewed and/or purchased by a user in a specific price band for a given item category, and these interactions may be used to infer the user's preference for that particular price band. In some embodiments, the price band activity data can be analyzed to determine a pattern of interactions of the user with respect to items in each price band for the item type category. Activity 830 can be performed by the affinity prediction model.

Method 800 can further comprise an activity 840 of generating one or more price affinity predictions for the user that indicate or predict the user's affinity or preference for items associated with one or more of the price bands. The one or more price affinity predictions can be generate based, at least in part, on the price band activity pattern data associated with the user. In some cases, the one or more price affinity predictions may be utilized to predict which price band of a given item type category a user is most likely to purchase from, and to customize outputs of end-user applications to include items from the price band.

As evidenced by the disclosure herein, the techniques set forth in this disclosure are rooted in computer technologies that overcome existing problems in known electronic platforms, including problems dealing with determining the relative expensiveness of items included in item type categories and/or determining user affinities for particular price bands in item type categories. The techniques described in this disclosure provide a technical solution (e.g., one that utilizes various machine learning techniques) for overcoming the limitations associated with known electronic platforms. For example, the prediction techniques described herein take advantage of novel machine learning techniques to learn functions for generating, inter alia, price bands, price affinity predictions, and/or item-item price similarity scores. This technology-based solution marks an improvement over existing capabilities and functionalities related to computer systems by improving the accuracy and quality of the predictions, and improving the personalization of outputs presented to users.

In various embodiments, the techniques described herein can be executed dynamically in real time as a user accesses interfaces provided by an electronic platform. In many embodiments, the techniques described herein can be used continuously at a scale that cannot be reasonably performed using manual techniques or the human mind (e.g., due to the large number of requests and queries that are processed by the electronic platform). Furthermore, the data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 7-8 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are potentially equivalents of express elements and/or limitations in the claims under the doctrine of equivalents.

What is claimed is:

1. A system comprising:

one or more processors; and one or more non-transitory computer-readable media storing computing instructions that, when executed on the one or more processors, cause the one or more processors to perform operations comprising:

evaluating, using a price band determination machine learning model, degrees of prices of items relative to each other in item type categories;

generating, using the price band determination machine learning model, price bands associated with the item type categories, wherein the price band determination machine learning model is trained using training procedures to generate the price bands by utilizing at least a clustering model, and wherein the clustering model comprises at least one of a K-means clustering model or a Gaussian mixture model;

assigning each of the items to a respective one of the price bands associated with a respective one of the item type categories, wherein the assigning further comprises using a similarity model to:

analyze historical usage data to determine (a) correlations between purchased items in separate item type categories and (b) corresponding price bands for the purchased items, compute item-item price band similarity scores across item type categories, and combine input features including price affinity predictions and the item-item price band similarity scores to generate ranking results that are used to generate item recommendation results; and presenting, to one or more end-user applications, at least one other item corresponding to at least one of the price bands associated with at least one of the item type categories, wherein the item recommendation results comprise the at least one other item.

2. The system of claim 1, wherein generating the price bands further comprises:
analyzing price band activity data associated with an item of the item type categories, wherein the price band activity comprises interactions by a user; and
generating activity patterns of the user based on the interactions.

3. The system of claim 1, wherein the instructions, when executed on the one or more processors, cause the one or more processors to further perform an operation comprising generating, using an affinity prediction model, price affinity predictions for users, wherein the price affinity predictions for the users predict preferences for the users with respect to the price bands associated with the item type categories.

4. The system of claim 1, wherein the instructions, when executed on the one or more processors, cause the one or more processors to further perform an operation comprising ranking, using a ranking engine using machine learning, outputs in an ordered sequence.

5. The system of claim 1, wherein the one or more end-user applications utilize price indicators associated with the degrees of prices of the items to generate outputs, and wherein the outputs generated by the one or more end-user applications comprise:
recommendation results ranked based at least in part on the price indicators;
search results ranked in an ordered list based at least in part on the price indicators; or advertisements selected based at least in part on the price indicators.

6. The system of claim 5, wherein:
the price indicators of the items are stored in metadata associated with the items; and
the price indicators of the items identify the price bands that are associated with the items.

7. The system of claim 1, wherein the price band determination machine learning model comprises a transaction balancing model to identify respective price range boundaries associated with respective price bands of the price bands for respective ones of the item type categories, and wherein the transaction balancing model further identifies the respective price range boundaries for the respective price bands of the price bands in a manner that accounts for transaction volumes associated with respective ones of the items.

8. The system of claim 1, wherein the clustering model identifies respective price range boundaries associated with the price bands.

9. The system of claim 1, wherein the price band determination machine learning model executes a statistical model to identify respective price range boundaries associated with the price bands, and wherein the statistical model comprises a range-based statistical model or a percentile-based statistical model.

10. A method implemented via execution of computing instructions configured to run at one or more processors and configured to be stored at non-transitory computer-readable media, the method comprising:
evaluating, using a price band determination machine learning model, degrees of prices of items relative to each other in item type categories;
generating, using the price band determination machine learning model, price bands associated with the item type categories, wherein the price band determination machine learning model is trained using training procedures to generate the price bands by utilizing at least a clustering model, and wherein the clustering model comprises at least one of a K-means clustering model or a Gaussian mixture model;
assigning each of the items to a respective one of the price bands associated with a respective one of the item type categories, wherein the assigning further comprises using a similarity model to:
analyze historical usage data to determine (a) correlations between purchased items in separate item type categories and (b) corresponding price bands for the purchased items,
compute item-item price band similarity scores across item type categories, and
combine input features including price affinity predictions and the item-item price band similarity scores to generate ranking results that are used to generate item recommendation results; and
presenting, to one or more end-user applications, at least one other item corresponding to at least one of the price bands associated with at least one of the item type categories, wherein the item recommendation results comprise the at least one other item.

11. The method of claim 10, wherein generating the price bands further comprises:
analyzing price band activity data associated with an item of the item type categories, wherein the price band activity comprises interactions by a user; and
generating activity patterns of the user based on the interactions.

12. The method of claim 10, wherein the instructions, when executed on the one or more processors, cause the one or more processors to further perform an operation comprising generating, using an affinity prediction model, price affinity predictions for users, wherein the price affinity predictions for the users predict preferences for the users with respect to the price bands associated with the item type categories.

13. The method of claim 10, wherein the instructions, when executed on the one or more processors, cause the one or more processors to further perform an operation comprising ranking, using a ranking engine using machine learning, outputs in an ordered sequence.

14. The method of claim 10, wherein the one or more end-user applications utilize price indicators associated with the degrees of prices of the items to generate outputs, and wherein the outputs generated by the one or more end-user applications comprise:
recommendation results ranked based at least in part on the price indicators;
search results ranked in an ordered list based at least in part on the price indicators; or
advertisements selected based at least in part on the price indicators.

15. The method of claim 14, wherein:
the price indicators of the items are stored in metadata associated with the items; and
the price indicators of the items identify the price bands that are associated with the items.

16. The method of claim 10, wherein the price band determination machine learning model comprises a transaction balancing model to identify respective price range boundaries associated with respective price bands of the price bands for respective ones of the item type categories, and wherein the transaction balancing model further identifies the respective price range boundaries for the respective price bands of the price bands in a manner that accounts for transaction volumes associated with respective ones of the items.

17. The method of claim 10, wherein the clustering model identifies respective price range boundaries associated with the price bands.

18. The method of claim 10, wherein the price band determination machine learning model executes a statistical model to identify respective price range boundaries associated with the price bands, and wherein the statistical model comprises a range-based statistical model or a percentile-based statistical model.

19. A non-transitory computer-readable medium storing computing instructions that, when executed by one or more processors, cause the one or more processors to perform operations comprising:
- evaluating, using a price band determination machine learning model, degrees of prices of items relative to each other in item type categories;
- generating, using the price band determination machine learning model, price bands associated with the item type categories, wherein the price band determination machine learning model is trained using training procedures to generate the price bands by utilizing at least a clustering model, and wherein the clustering model comprises at least one of a K-means clustering model or a Gaussian mixture model;
- assigning each of the items to a respective one of the price bands associated with a respective one of the item type categories, wherein the assigning further comprises using a similarity model to:
  - analyze historical usage data to determine (a) correlations between purchased items in separate item type categories and (b) corresponding price bands for the purchased items,
  - compute item-item price band similarity scores across item type categories, and
  - combine input features including price affinity predictions and the item-item price band similarity scores to generate ranking results that are used to generate item recommendation results; and
- presenting, to one or more end-user applications, at least one other item corresponding to at least one of the price bands associated with at least one of the item type categories, wherein the item recommendation results comprise the at least one other item.

20. The non-transitory computer-readable medium of claim 19, wherein the operations further comprise:
- ranking, using a ranking engine using machine learning, to rank outputs in an ordered sequence.

* * * * *